Dec. 5, 1933.  R. L. IRWINE  1,938,387
AUTOMATIC SOLDERING MACHINE
Filed Oct. 3, 1930    6 Sheets-Sheet 2

INVENTOR
Robert L. Irwine
BY Kenyon & Kenyon
ATTORNEYS.

Dec. 5, 1933.     R. L. IRWINE     1,938,387
AUTOMATIC SOLDERING MACHINE
Filed Oct. 3, 1930     6 Sheets-Sheet 4

INVENTOR
Robert L. Irwine
BY Kenyon & Kenyon
ATTORNEY

Dec. 5, 1933.   R. L. IRWINE   1,938,387
AUTOMATIC SOLDERING MACHINE
Filed Oct. 3, 1930   6 Sheets-Sheet 5

Patented Dec. 5, 1933

1,938,387

UNITED STATES PATENT OFFICE 1,938,387

AUTOMATIC SOLDERING MACHINE

Robert L. Irwine, Newark, N. J., assignor to Motor Improvements, Inc., Newark, N. J., a corporation of Delaware Application October 3, 1930. Serial No. 486,141

36 Claims. (Cl. 113—59)

This invention relates to automatic soldering machines and has for an object a machine for advancing and rotating a succession of casings having mechanically formed seams and applying solder to each seam while the casing is being advanced and rotated.

A machine embodying the invention consists of a conveyor equipped with a plurality of holders for the casings. Means are provided to cause the holders to rotate as the conveyor advances and means are provided along the path of the holders for heating the casings as they are advanced. Means also are provided for directing a ribbon of solder along the seam of the heated casing, the solder being melted upon contact with the hot casing and flowing into and sealing the seam. The solder applying means advances simultaneously with the casing while the latter is making one complete rotation and is then returned to its original position to repeat the operation on the succeeding casing. The soldered casing is then carried by the conveyor through cooling means by which it is cooled to room temperature after which it is removed from its holder.

Other objects, novel features and advantages of this invention will be apparent from the following specification and accompanying drawings wherein Figs. 1 and 1A constitute a plan view of a machine embodying the invention.

The frame 10 is provided at either end with a pair of sprocket wheels 11 around which are trained two endless chains 12 connected together at regular intervals by bridges 13. One pair of sprocket wheels 11 are keyed to a shaft 11a which is provided with a pulley 11b by which rotation of this pair of wheels is produced by means of any suitable driving mechanism, not shown.

Each bridge 13 carries a holder 14 having a stem 15 rotatably supported by means of an anti-friction bearing 16. The ends of the bridges 13 ride on guides 13a and 13b while the upper reaches of the chains 12 travel in channel members 12a. At its lower end each stem 15 is provided with a pinion 17 which is adapted to mesh with a rack 18 extending substantially the full length of the frame 10. A plurality of gas burners 19 are arranged along approximately one-half of the path travelled by the holders for heating the casings as they are advanced by the conveyor.

Figure 6:
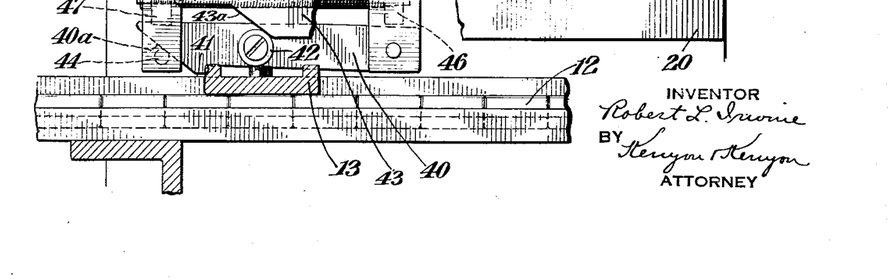
Fig. 6 is a section on the line 6—6 of Fig. 5.

Near the center of the frame there is provided mechanism for projecting a ribbon of solder onto the seam of the casing. A table 20 is supported by the frame 10 and is provided with a plate 21 extending over one of the chains 12. On the plate 21 there is slidably mounted a carrier 23 in which there is rotatably mounted a vertical shaft 24 having keyed thereto near its lower end a pinion 25 the teeth of which project beyond the face of the carrier and having a knurled wheel 26 fastened to its upper end. A rack 27 is mounted on the plate 21 with its teeth in mesh with the teeth of the pinion 25 so that rotation of the wheel 26 is effected upon reciprocation of the carrier. A second knurled wheel 28 having flanges 28a which overlie the wheel 26, is mounted on a vertical shaft 29 rotatably supported by a bearing 30. The bearing 30 is contained in an elongated slot in the carrier so arranged that the wheel 28 may be moved toward and away from the wheel 26. A shaft 31 extends horizontally through the carrier and lies partially across one end of the slot. This shaft is cut away as at 31a so that in one position of the shaft (Fig. 7) the bearing 30 may move to the end of the slot while in another position of the shaft the bearing is prevented from moving to the end of the slot (Fig. 6).

A grooved wheel 33 is supported by the carrier 23 and around this wheel is trained the solder ribbon or wire S which passes from the roller 33 between the wheels 26 and 28 by which the ribbon is advanced as required. Between the wheel 33 and the feed wheels 26 and 28 are provided a pair of rollers 34 mounted on pivoted arms 35 which are drawn toward each other by a spring 36. One of the rollers is provided with ratchet teeth which are engaged by a pawl 37 to prevent backward rotation thereof. The solder ribbon passes between these rollers which prevent movement of the ribbon in one direction while allowing movement thereof in the other direction. On the opposite side of the rollers 26 and 28 there is provided a guide tube 38 into which the ribbon or wire S is passed from the feed wheels 26 and 28. This tube is properly arranged to direct the ribbon or wire S onto the seam to be soldered. When the shaft 31 is in the position shown in Fig. 7, the spring 32 brings the wheel 28 into such position that the wire S is gripped by the wheels 26 and 28 whereby feeding of the wire is effected upon rotation of the wheel 26.

A latch lever 40 is pivoted to the carrier 23 and is provided with a shoulder 41 adapted to be engaged by a bridge 13 to cause unitary movement of the carrier and bridge. The lever 40 is provided with a roller 42 which underlies a guide shoulder 43 formed on the table 20. This shoulder is provided with an inclined portion 43a which permits the lever 40 to disengage the shoulder 41 from a bridge. The lever is also provided with an inclined surface 40a which engages a pin 44 to lift the lever 40, the pin 44 being supported by the table. A spring 45 is interposed between a lug 46 on the carrier 23 and a lug 47 on the table 20. Each bridge 13 in succession engages the shoulder 41 and pulls the carrier from the position shown in Fig. 7 to the position shown in Fig. 6 where the latch 40 is lifted. During this movement of the carrier the spring 45 is compressed and, when the latch 40 is lifted, the spring returns the carrier to the position shown in Fig. 7, the latch lever 40 being returned to position to be engaged by the next bridge 13.

Figure 7:
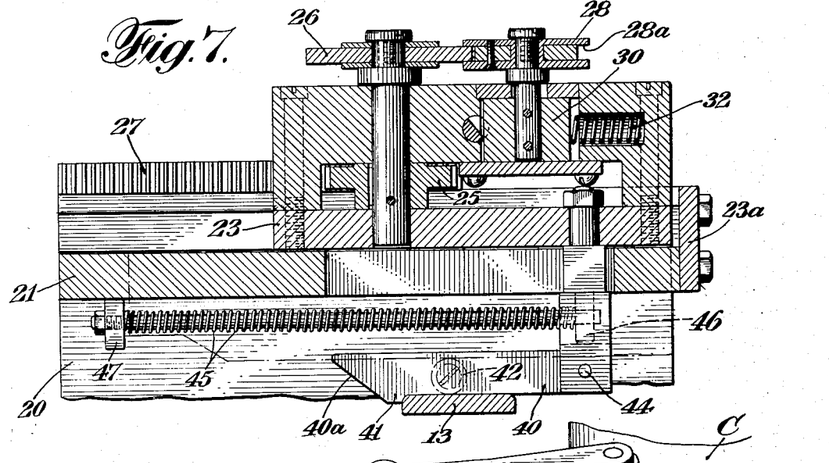
Fig. 7 is a fragmentary view similar to Fig. 6 but with the elements in a different position.
Figure 8:
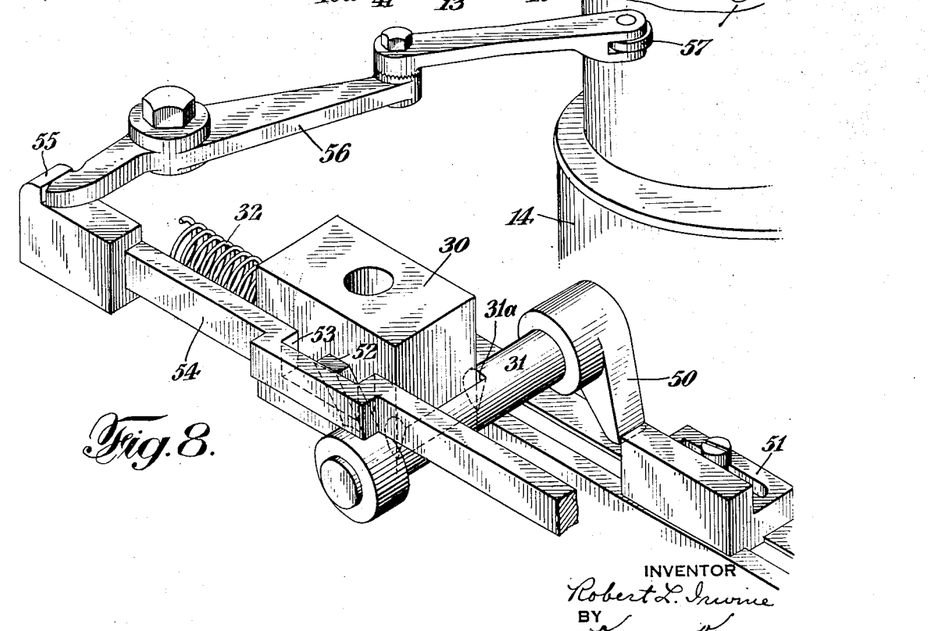
Fig. 8 is a perspective skeleton view of a portion of the machine.

Means are provided for actuating the shaft 31 to effect reciprocation of the bearing 30 to move the wheel 28 into and out of gripping relation to the wheel 26. One end of the shaft is provided with a depending arm 50, the free end of which is adapted to engage a stop 51 adjustably mounted on the plate 21, the arrangement being such that engagement of the arm with the stop rotates the shaft from the position shown in Fig. 7 to the position shown in Fig. 6. The other end of the shaft 31 is provided with an arm 52 which extends into a recess 53 formed in a slide 54 mounted on the carrier 23. At one end the slide is provided with a shoulder 55 which engages one end of a lever or feeler 56 pivoted to the carrier; the other end of the lever 56 is provided with a roller 57 adapted to be engaged by a casing in a holder 14. Rotation of the shaft from the position shown in Fig. 6 to the position shown in Fig. 7 is effected by movement of the slide 54 caused by movement of the lever 56. The arrangement of these various elements is such that the slide 54 is actuated at the time a bridge 13 engages the latch 40 and the arm 50 engages the stop 51 at the time the latch 40 is lifted.

Beyond the solder applying mechanism there is supported a pipe 60 having perforations through which air is forced to effect cooling of the casing after the soldering operation has been completed. Fans 61 may also be provided to assist in the cooling operation. As the completed casing approaches the end of the frame it is removed from the holder by the operator of the machine.

Figures 9, 10:
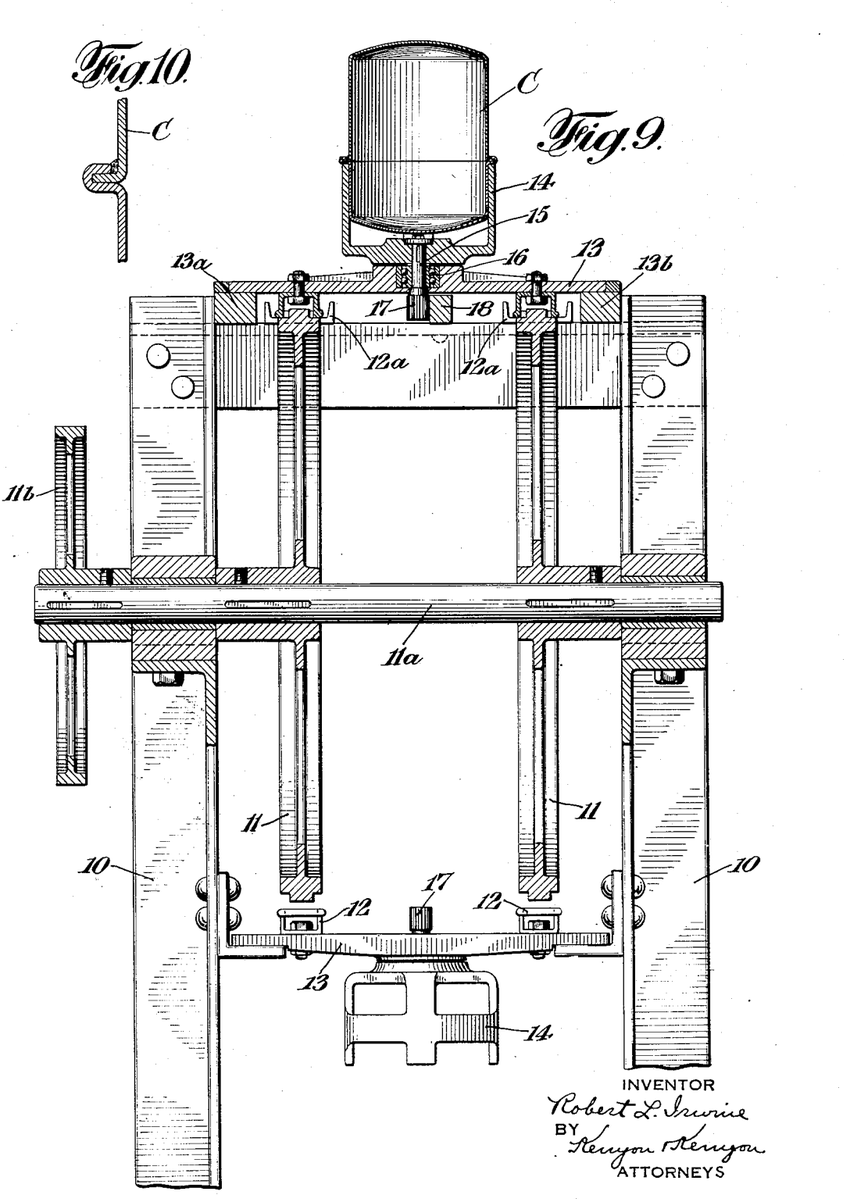
Fig. 9 is an enlarged section on the line 9—9 of Fig. 1.
Fig. 10 is a fragmentary sectional view through the casing after the soldering operation has been completed.

In Figs. 9 and 10 disclosure is made of a casing of the type soldered by this machine. The casing C comprises two cup-shaped sections having rims one of which is bent over the other mechanically to form a seam. Solder is filled into the crevice thus provided thereby securely sealing the mechanical seam.

Figure 1:
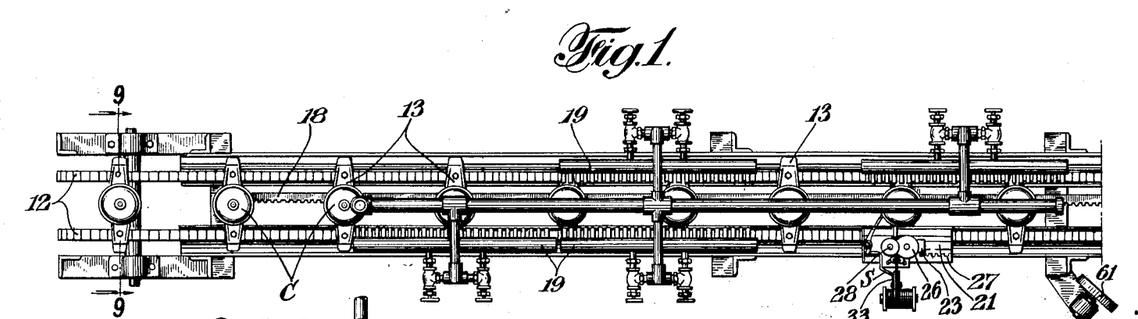
Figure 1A:
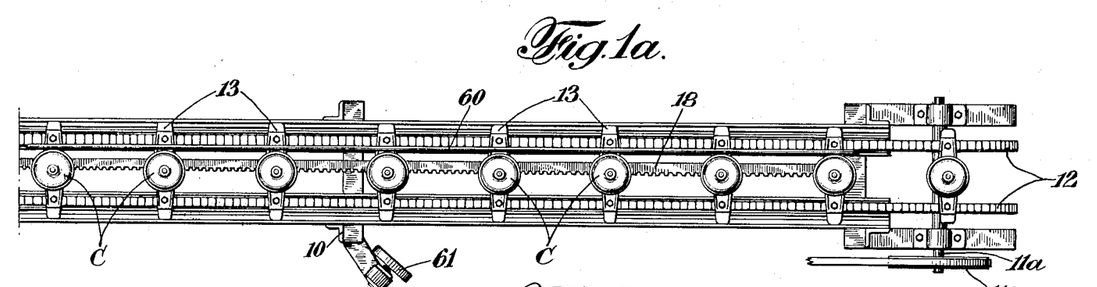
Figure 2:
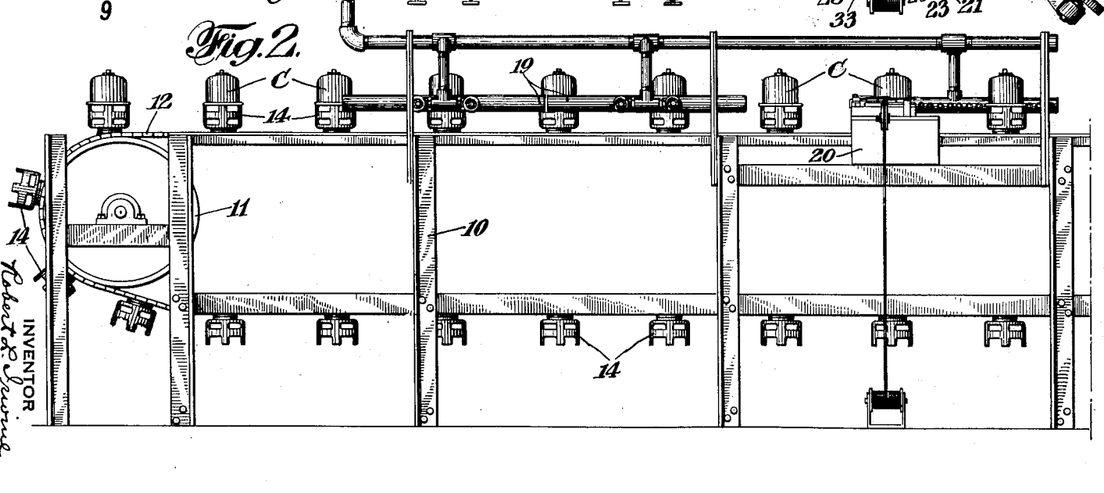
Figs. 2 and 2A constitute an elevation of such machine.
Figure 2A:
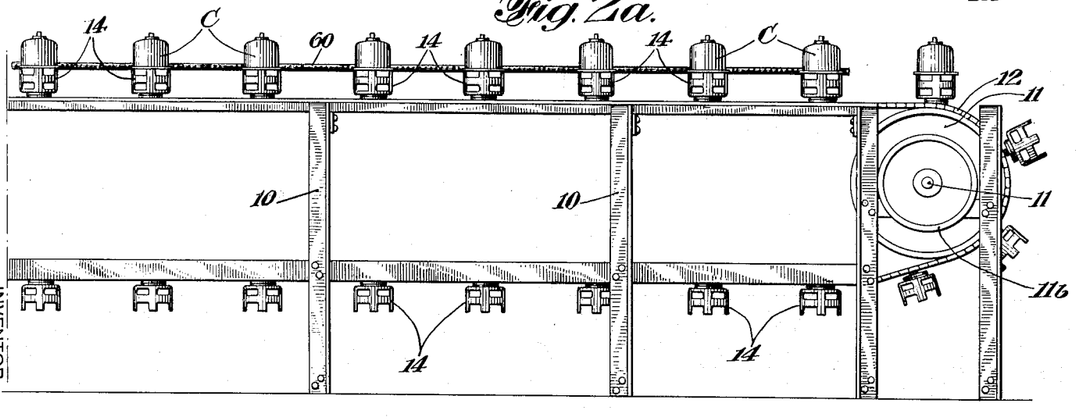
Figure 3:
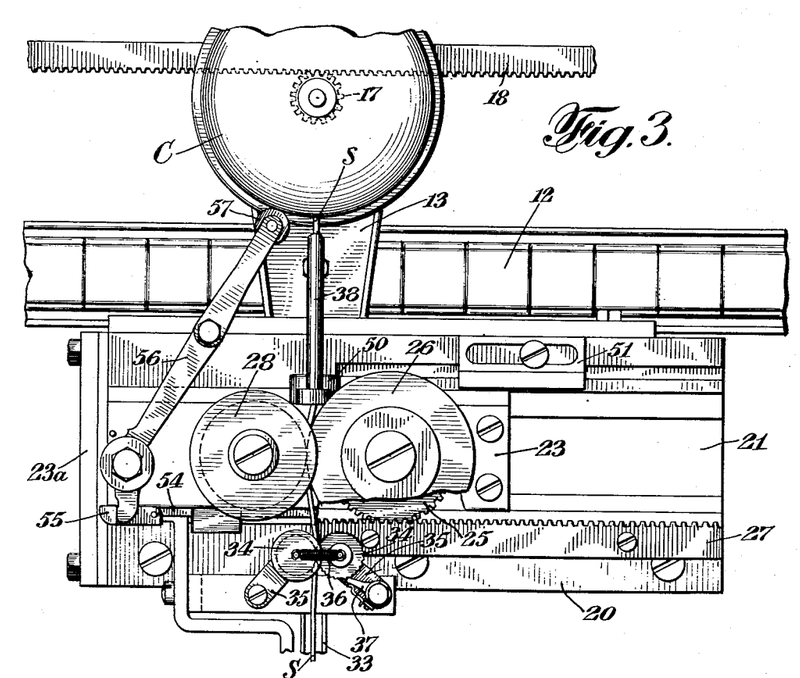
Fig. 3 is an enlarged plan view of the solder applying means.
Figure 4:
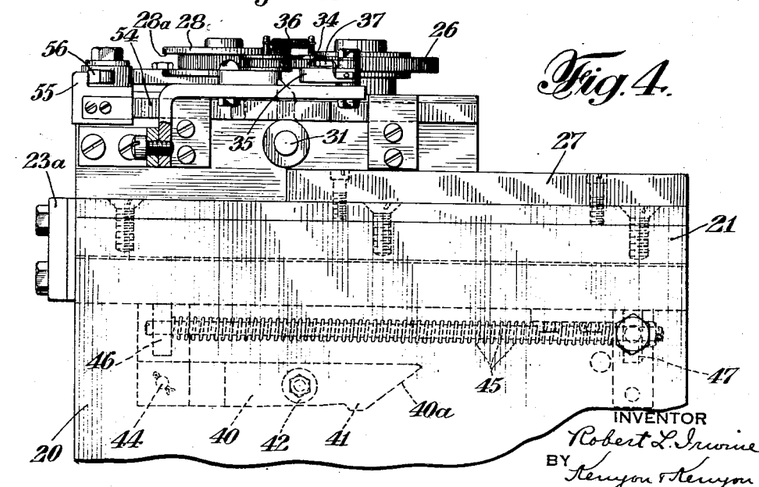
Fig. 4 is a side elevation of the same.
Figure 5:
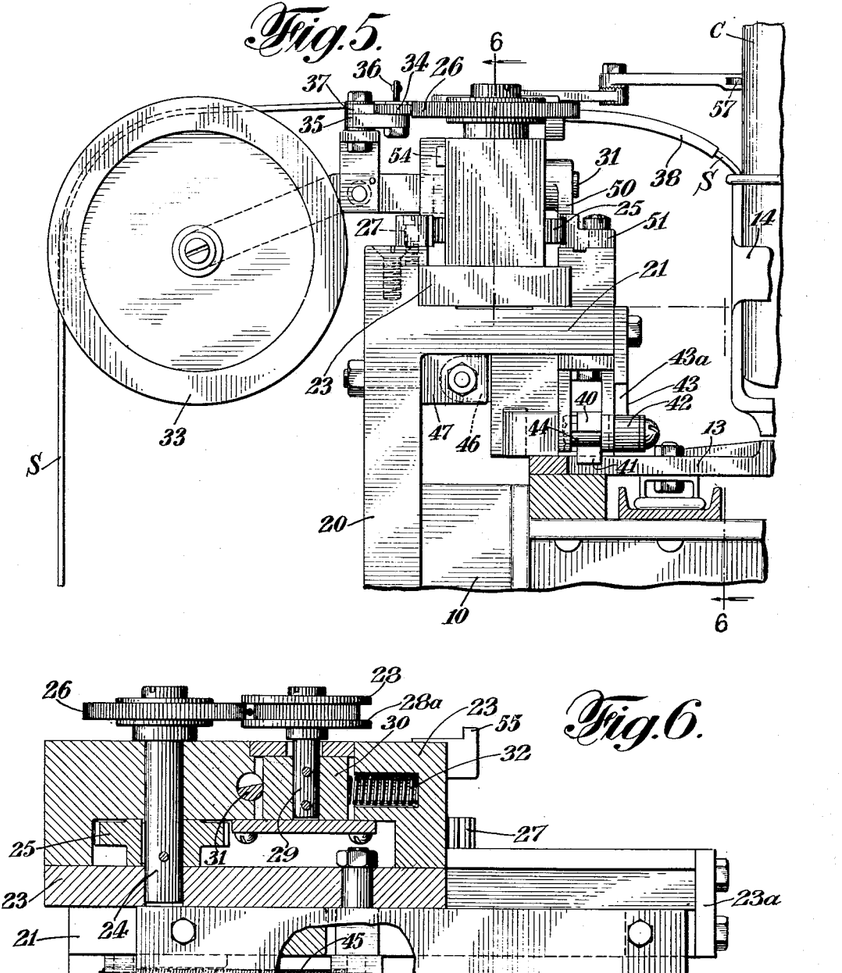
Fig. 5 is an end view of the same.

In the operation of the machine, the conveyor is caused to advance at a uniform speed and casings C having seams to be soldered are successively inserted in holders 14. As each holder advances toward the central portion of the machines, its pinion 17 meshes with the rack 18, thereby causing rotation of the holder and casing. As the holder and casing advance, the casing is heated along the seam by means of the gas burners 19 and the full length of the seam is brought to uniform temperature by reason of the rotation of the casing. The casing approaches the solder applying mechanism with the elements of the latter in the position shown in Figs. 1, 4 and 6. The carriage 23 is in its extreme left-hand position and is held against abutment 23a by the spring 45. The latch lever 40 is in position to be engaged by a bridge 13 and the lever 56 projects into the path of the oncoming casing. The shaft 31 is in the position shown in Fig. 6 so that the feed wheels 26 and 28 are spaced and do not grip the wire S. The casing engages the roller 57 and swings the lever 56 into the position shown in Fig. 3, thereby pulling the slide 54 and effecting rotation of the shaft 31 into the position shown in Fig. 7 and allowing spring 32 to move the bearing 30 to carry the feed wheel 28 toward the feed wheel 26, so that the ribbon S is gripped between these wheels. At the same time the bridge 13 engages the shoulder 41 of the latch lever 40. As the casing moves along, the slide 23 is unitarily moved with it, thereby causing rotation of the feed wheel 26 by reason of the engagement of the teeth of pinion 25 with the teeth of rack 27. The solder ribbon is thereupon fed onto the seam of the casing and becomes molten due to the temperature of the casing and fills in the crevice. The slide moves along with the casing until the latter has made one complete rotation and the seam has been treated with solder throughout its full extent. At this time the oblique surface 40a of the latch lever 40 engages the pin 44 thereby disengaging the shoulder 41 from the bridge 13. At the same time the arm 50 of the shaft 31 engages the stop 51 to return the shaft 31 to the position shown in Fig. 6, thereby moving the wheel 28 away from the wheel 26 and releasing the ribbon S. The spring 45 which was depressed during the above described movement of the carrier 23 thereupon returns the carrier to its original position. Rotation of the shaft 31 also causes the slide 54 to move on the carrier and to swing the lever 56 back into position to be engaged by the next casing. The soldered casing then moves along toward the right hand end of the machine while still rotating and is subjected to drafts of cold air for the purpose of cooling it down to room temperature. Upon its arrival at the end of the machine it is removed from its holder by the operator of the machine.

This machine automatically applies solder to the casing seam and requires merely the insertion and removal of the casing from the holders of the conveyors. The seams are efficiently and quickly sealed and the casing is completed by the soldering operation. The solder ribbon is fed only as required and there is no loss of solder. Should one of the holders be empty there will be no operation of the solder feeding means as the control for this means will not be tripped by a casing, thus preventing waste of solder.

It is apparent that various modifications may be made in the structure above described, without in any way departing from the spirit of the invention as defined in the appended claims.

I claim:

1. In an automatic soldering machine, a conveyor, a plurality of article holders carried by said conveyor, means to effect rotation of said holders, a reciprocatory carrier, means to connect said carrier to said conveyor for unitary movement therewith, means to disconnect said carrier from said conveyor and return it to its original position, and solder feeding means operated by movement of the carrier in one direction.

2. In an automatic soldering machine, a conveyor, a plurality of article holders carried by said conveyor, means to effect rotation of said holders, a reciprocatory carrier, means to connect said carrier to said conveyor for unitary movement therewith, solder feeding means mounted on said carrier and operated by movement thereof in one direction, and means to disconnect said carrier from said conveyor and return said carrier to original position without further operation of the solder feeding means.

3. In an automatic soldering machine, a carrier, a pair of solder feeding wheels supported by said carrier for relative linear movement, resilient means tending to move said wheels together, positive means for holding said wheels apart, means to render said last-named means inoperative, and means to rotate said wheels upon movement of said carrier.

4. In an automatic soldering machine, a reciprocable carrier, a pair of solder feeding wheels supported by said carrier, one of said wheels being movable toward and away from the other, means for effecting rotation of one of said wheels upon movement of the carrier, resilient means tending to move said wheels together, positive means for holding said wheels apart, and means to render said last-named means inoperative.

5. In an automatic soldering machine, a reciprocable carrier, a pair of solder feeding wheels supported by said carrier, one of said wheels being movable toward and away from the other, means for effecting rotation of one of said wheels upon movement of the carrier, resilient means tending to move said wheels together, positive means for holding said wheels apart, and means to render said last-named means alternately operative and inoperative.

6. In an automatic soldering machine, an article holder, means to effect linear and rotary movement of said holder, a reciprocatory carrier, solder feeding means supported by said carrier, means to effect limited unitary movement of said carrier and holder and return of said carrier to its original position, means operated by movement of the carrier in one direction to actuate said solder feeding means, and means releasable by the article for rendering said feeding means inoperative.

7. In an automatic soldering machine, an article holder, means to effect linear and rotary movement of said holder, a reciprocatory carrier, means to effect limited unitary movement of said holder and carrier and return of the carrier to its original position, solder feeding means mounted on said carrier, said solder feeding means being actuated upon movement of the carrier in one direction, and means releasable by the article for rendering said feeding means inoperative.

8. In an automatic soldering machine, an article holder, means to effect linear and rotary movement of said holder, a reciprocatory carrier, means to effect limited unitary movement of said holder and carrier and return of the carrier to its original position, solder feeding means mounted on said carrier, means operated by movement of the carrier in one direction to actuate said feeding means, and means releasable by the article for rendering said feeding means inoperative.

9. In an automatic soldering machine, an article holder, means to effect linear and rotary movement of said holder, a slidable carrier, a pair of wheels supported by said carrier, one of said wheels being movable toward and away from the other, resilient means tending to move said last-named wheel toward the other, positive means for preventing such movement, means to effect unitary linear movement of said carrier and holder and return of the carrier to its original position, and means actuated by an article in the holder to render said holding means inoperative during unitary movement of the carrier and holder.

10. In an automatic soldering machine, a conveyor, article holders carried by said conveyor, a carrier, solder feeding means on said carrier, means to effect connection between said conveyor and carrier whereby the latter is moved by the former, means to disconnect said carrier from the conveyor and reutrn it to its original position, and means operable upon movement of the carrier in one direction to actuate said feeding means.

11. In an automatic soldering machine, a conveyor, article holders mounted on said conveyor, a slideable carrier, a pair of feed wheels supported by said carrier for relative linear movement, resilient means tending to move said wheels together, positive means for holding said wheels apart, means for connecting said conveyor and carrier for unitary movement, means for disconnecting said carrier and returning it to normal position, and means for alternately rendering said positive means inoperative.

12. In an automatic soldering machine, a conveyor, article holders mounted on said conveyor, a slidable carrier, a pair of feed wheels supported by said carrier for relative linear movement, resilient means tending to move said wheels together, positive means for holding said wheels apart, means for connectitng said conveyor and carrier for unitary movement, means for disconnecting said carrier and returning it to normal position, means operable by an article to render said holding means inoperative, and means operative at the time of disconnection of the carrier from the conveyor for rendering said holding means operative.

13. In an automatic soldering machine, a conveyor, article holders mounted on said conveyor, a slidable carrier, means to connect said carrier and conveyor for unitary movement, means to disconnect said carrier from said conveyor and return the same to its original position, a pair of feed wheels supported by said carrier, one of said feed wheels being movable toward and away from the other, resilient means tending to move said second wheel toward said first wheel, an oscillating member operative in one position to hold said movable wheel away from said other wheel and in second position to permit movement of said movable wheel toward said other wheel, means operated by an article in a holder for moving said member into its first position, and means operative at the time of disconnection of the carrier from the conveyor for moving said member into its second position.

14. In an automatic soldering machine, a conveyor, holders carried by said conveyor, a slidable carrier, means to connect said carrier to said conveyor to effect movement of the carrier in one direction, means to disconnect said carrier from the conveyor and return it to its original position, a pair of feed wheels supported by said carrier for relative linear movement, resilient means tending to move the wheels together, a rotatable member effective in one position to hold the wheels apart and in second position permitting movement of the wheels together, means operated by an article in a holder to move said member into its second position, and means effective at the time of disconnection of said carrier from said conveyor for moving said member into its first position.

15. An automatic soldering machine, a conveyor, article holders carried by said conveyor, a slidable carrier, means to connect said carrier to said conveyor to effect movement of the former in one direction, means to disconnect said carrier from said conveyor, and return the carrier to its original position, a pair of solder feeding wheels supported by said carrier for relative linear movement, means tending to move said wheels together, a rotatable member effective in one position to hold said wheels apart and in a second position to permit movement of said wheels toward each other, means operated by an article to move said member into its second position, and means operated at the time of disconnection of the carrier from the conveyor to move said member into its first position.

16. In an automatic soldering machine, a conveyor, article holders carried by said conveyor, a slidable carrier, means for connecting together said carrier and conveyor to effect movement of the carrier in one direction, means to disconnect said carrier from said conveyor and return the same to its original position, a pair of solder-feeding wheels supported by said carrier for relative linear movement, resilient means tending to move said wheels together, a rotatable member effective in one position to permit movement of said wheels under the influence of said spring and in a second position to prevent such movement of the wheels, means operable by an article to move said member into its first position, means effective at the time of disconnection of said carrier from said conveyor to move said member into its second position, a stationary rack, and a pinion carried by one of said wheels and meshing with said rack.

17. In an automatic soldering machine, an article holder, means to effect linear and rotary movement of said holder, means for heating the article, a slidable carrier, a pair of wheels supported by said carrier, one of said wheels being movable toward and away from the other, resilient means tending to move said last-named wheel toward the other, positive means for preventing such movement, means to effect unitary linear movement of said carrier and holder and return of the carrier to its original position, means for effecting rotation of one of said wheels upon movement of the carrier, and means actuated by an article in the holder to render said holding means inoperative during unitary movement of the carrier and holder.

18. In an automatic soldering machine, a conveyor, article holders carried by said conveyor, means for heating the article, a carrier, solder feeding means on said carrier, means to effect connection between said conveyor and carrier whereby the latter is moved by the former, means to disconnect said carrier from the conveyor and return it to its original position, and means operable upon movement of the carrier in one direction to actuate said feeding means.

19. In an automatic soldering machine, a conveyor, article holders mounted on said conveyor, a slidable carrier, a pair of feed wheels supported by said carrier for relative linear movement, resilient means tending to move said wheels together, positive means for holding said wheels apart, means for connecting said conveyor and carrier for unitary movement, means for disconnecting said carrier and returning it to normal position, means for effecting rotation of one of said wheels upon movement of the carrier, and means for alternately rendering said positive means operative and inoperative.

20. In an automatic soldering machine, a conveyor, article holders mounted on said conveyor, means for heating the article, a slidable carrier, a pair of feed wheels supported by said carrier for relative linear movement, resilient means tending to move said wheels together, positive means for holding said wheels apart, means for connecting said conveyor and carrier for unitary movement, means for disconnecting said carrier and returning it to normal position, means for effecting rotation of one of said wheels upon movement of the carrier, and means for alternately rendering said positive means inoperative and operative.

21. In an automatic soldering machine, a conveyor, article holders mounted in said conveyor, means for heating the article, a slidable carrier, a pair of feed wheels supported by said carrier for relative linear movement, resilient means tending to move said wheels together, positive means for holding said wheels apart, means for connecting said conveyor and carrier for unitary movement, means for disconnecting said carrier and returning it to normal position, means for effecting rotation of one of said wheels upon movement of the carrier, means operable by an article to render said holding means inoperative, and means operative at the time of disconnection of the carrier from the conveyor for rendering said holding means operative.

22. In an automatic soldering machine, a conveyor, article holders mounted on said conveyor, means for heating the article, a slidable carrier, means to connect said carrier and conveyor for unitary movement, means to disconnect said carrier from said conveyor and convey the same to its original position, a pair of feed wheels supported by said carrier, one of said feed wheels being movable toward and away from the other, resilient means tending to move said second wheel toward said first wheel, means for effecting rotation of one of said wheels upon movement of the carrier, an oscillating member operative in on position to hold said movable wheel away from said other wheel, and in second position to permit movement of said movable wheel toward said other wheel, means operated by an article in a holder for moving said member into its first position, and means operative at the time of disconnection of the carrier from the conveyor for moving said member into its second position.

23. In an automatic soldering machine, a conveyor, holders carried by said conveyor, means for heating the article, a slidable carrier, means to connect said carrier to said conveyor to effect movement of the carrier in one direction, means to disconnect said carrier from the conveyor and return it to its original position, a pair of feed wheels supported by said carrier for relative linear movement, means for effecting rotation of one of said wheels upon movement of the carrier, resilient means tending to move the wheels together, a rotatable member effective in one position to hold the wheels apart and in second position permitting movement of the wheels together, means operated by an article in a holder to move said member into its second position, and means effective at the time of disconnection of said carrier from said conveyor for moving said member into its first position.

24. An automatic soldering machine, a conveyor, article holders carried by said conveyor, means for heating the article, a slidable carrier, means to connect said carrier to said conveyor to effect movement of the former in one direction, means to disconnect said carrier from said conveyor and return the carrier to its original position, a pair of solder feeding wheels supported by said carrier for relative linear movement, means for effecting rotation of one of said wheels upon movement of the carrier, means tending to move said wheels together, a rotatable member effective in one position to hold said wheels apart and in a second position to permit movement of said wheels toward each other, means operated by an article to move said member into its second position, and means operated at the time of disconnection of the carrier from the conveyor to move said member into its first position.

25. In an automatic soldering machine, a conveyor, article holders carried by said conveyor, means for heating the article, a slidable carrier, means for connecting together said carrier and conveyor to effect movement of the carrier in one direction, means to disconnect said carrier from said conveyor and return the same to its original position, a pair of solder feeding wheels supported by said carrier for relative linear movement, resilient means tending to move said wheels together, a rotatable member effective in one position to permit movement of said wheels under the influence of said spring and in a second position to prevent such movement of the wheels, means operable by an article to move said member into its first position, means effective at the time of disconnection of said carrier from said conveyor to move said member into its second position, a stationary rack, and a pinion carried by one of said wheels and meshing with said rack.

26. In an automatic soldering machine, a conveyor, article holders carried by said conveyor, means for heating said articles, a slidable carrier, a latch for connecting said carrier to said conveyor, means to disengage said latch from said conveyor, resilient means for returning said carrier to original position, a pair of solder feeding wheels supported by said carrier for relative linear movement, resilient means tending to move said wheels together, a rotatable member effective in one position to permit movement of said wheels under the influence of said spring and in another position to prevent such movement of the wheels, means operable by an article to move said member into its first position, means effective at the time of disconnection of said latch to move said member into its second position, and means to effect rotation of one of said wheels upon movement of said carrier.

27. In an automatic soldering machine, a conveyor, article holders carried by said conveyor, means for heating said articles, a slidable carrier, a latch for connecting said carrier to said conveyor, means to disengage said latch from said conveyor, resilient means for returning said carrier to original position, a pair of solder feeding wheels supported by said carrier for relative linear movement, resilient means tending to move said wheels together, a rotatable member effective in one position to permit movement of said wheels under the influence of said spring and in another position to prevent movement of the wheels, means operable by an article to move said member into its first position, means effective at the time of disconnection of said latch to move said member into its second position, a stationary rack and a pinion carried by one of said wheels and meshing with said rack, and means to effect rotation of one of said wheels upon movement of said carrier.

28. In an automatic soldering machine, a conveyor, article holders carried by said conveyor, means for heating said articles, a slidable carrier, a latch for connecting said carrier to said conveyor, means to disengage said latch from said conveyor, resilient means for returning said carrier to original position, a pair of solder feeding wheels supported by said carrier for relative linear movement, resilient means tending to move said wheels together, a rotatable member effective in one position to permit movement of said wheels under the influence of said spring and in another position to prevent such movement of the wheels, means operable by an article to move said member into its first position, means effective at the time of disconnection of said latch to move said member into its second position, means to effect rotation of one of said wheels upon movement of said carrier, and means for heating said article.

29. In an automatic soldering machine, a conveyor, article holders carried by said conveyor, means for heating said articles, a slidable carrier, a latch for connecting said carrier to said conveyor, means to disengage said latch from said conveyor, resilient means for returning said carrier to original position, a pair of solder feeding wheels supported by said carrier for relative linear movement, resilient means tending to move said wheels together, a rotatable member effective in one position to permit movement of said wheels under the influence of said means and in another position to prevent movement of the wheels, means operable by an article to move said member into its first position, means effective at the time of disconnection of said latch to move said member into its second position, a stationary rack and a pinion carried by one of said wheels and meshing with said rack, means to effect rotation of one of said wheels upon movement of said carrier, and means for heating said article.

30. In an automatic soldering machine, a conveyor, article holders mounted on said conveyor, means to rotate said holders, a slidable carrier, a pair of feed wheels supported by said carrier for relative linear movement, resilient means tending to move said wheels together, positive means for holding said wheels apart, means for connecting said conveyor and carrier for unitary movement, means for disconnecting said carrier and returning it to normal position, and means for alternately rendering said positive means inoperative and operative.

31. In an automatic soldering machine, a conveyor, article holders mounted on said conveyor, means to rotate said holders, means for heating the article, a slidable carrier, a pair of feed wheels supported by said carrier for relative linear movement, resilient means tending to move said wheels together, positive means for holding said wheels apart, means for connecting said conveyor and carrier for unitary movement, means for disconnecting said carrier and returning it to normal position, means for effecting rotation of one of said wheels upon movement of the carrier, and means for alternately rendering said positive means inoperative and operative.

32. In an automatic soldering machine, a conveyor, article holders mounted on said conveyor, means to rotate said holders, a slidable carrier, a pair of feed wheels supported by said carrier for relative linear movement, resilient means tending to move said wheels together, positive means for holding said wheels apart, means for connecting said conveyor and carrier for unitary movement, means for disconnecting said carrier and returning it to normal position, means operable by an article to render said holding means inoperative, and means operative at the time of disconnection of the carrier from the conveyor for rendering said holding means operative.

33. In an automatic soldering machine, a conveyor, article holders mounted on said conveyor, means to rotate said holders, means for heating the article, a slidable carrier, a pair of feed wheels supported by said carrier for relative linear movement, resilient means tending to move said wheels together, positive means for holding said wheels apart, means for connecting said conveyor and carrier for unitary movement, means for disconnecting said carrier and returning it to normal position, means for effecting rotation of one of said wheels upon movement of the carrier, means operable by an article to render said holding means inoperative, and means operative at the time of disconnection of the carrier from the conveyor for rendering said holding means operative.

34. In an automatic soldering machine, a conveyor, article holders carried by said conveyor, a carrier, solder feeding means on said carrier, means to effect connection between said conveyor and carrier whereby the latter is moved by the former, means to disconnect said carrier from the conveyor and return it to its original position, means operable by movement of the carrier in one direction to actuate said feeding means, and means releasable by the article for rendering said feeding means inoperative.

35. In an automatic soldering machine, a conveyor, article holders carried by said conveyor, means to effect rotary movement of said holders, means to feed solder wire in timed relation to the movement of an article, means to effect connection between said conveyor and carrier whereby the latter is moved by the former, means to disconnect said carrier from the conveyor and return it to its original position, and means releasable by the article for rendering said feeding means inoperative.

36. In an automatic soldering machine, a conveyor, article holders carried by said conveyor, means to effect rotary movement of said holders, means to feed solder wire in timed relation to the movement of an article, means to effect connection between said conveyor and carrier whereby the latter is moved by the former, means to disconnect said carrier from the conveyor and return it to its original position, means releasable by the article for rendering said feeding means inoperative, and means to heat articles in said holders.

ROBERT L. IRWINE.